(No Model.)
A. DUCASBLE.
ELASTIC TIRE.
No. 596,488. Patented Jan. 4, 1898.
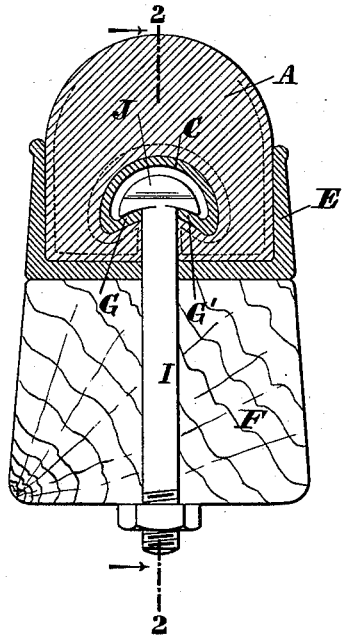
FIG: 1.
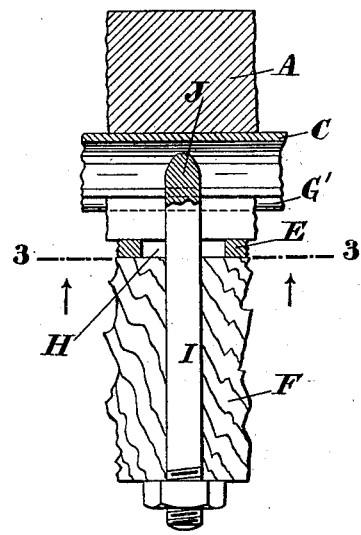
FIG: 2.
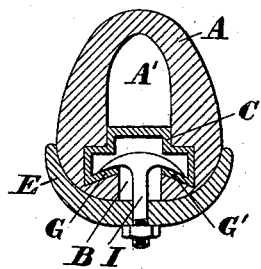
FIG: 4.
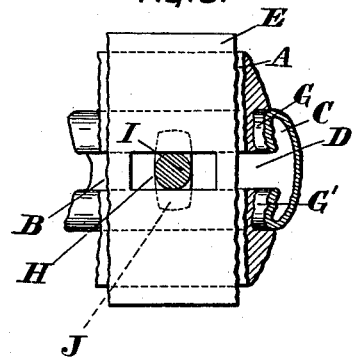
FIG: 3.
Witnesses
D. S. Ober
B. K. Sommers
Inventor
Alfred Ducasble
By Henry Orth
Attorney.
THE NORRIS PETERS CO., PHOTO-LITHO., WASHINGTON, D. C.

UNITED STATES PATENT OFFICE.

ALFRED DUCASBLE, OF PARIS, FRANCE.

ELASTIC TIRE.

SPECIFICATION forming part of Letters Patent No. 596,488, dated January 4, 1898.

Application filed September 23, 1897. Serial No. 652,755. (No model.) Patented in France May 12, 1894, No. 238,483, and in England June 15, 1895, No. 11,707.

*To all whom it may concern:*

Be it known that I, ALFRED DUCASBLE, a citizen of the Republic of France, residing at Paris, France, have invented a certain new and useful Improvement in Elastic Tires for Cycles and other Vehicles, (for which I have obtained Letters Patent in France, No. 238,483, dated May 12, 1894, with an addition dated January 8, 1895, and in Great Britain, No. 11,707, dated June 15, 1895;) and I do hereby declare that the following is a full, clear, and exact description of the same.

This invention relates to tires suitable for the wheels of cycles, invalid-chairs, cabs, and other vehicles and to means for securing them upon the wheel-rim in such a manner that they can be easily put on and taken off and the connection of which with the wheel-rim is extremely reliable and in particular is such that the tearing of a tire at one or more places does not result in the detachment of the whole tire.

A tire according to this invention comprises a thick hollow india-rubber ring which on the side adjacent to the wheel-rim is open along the whole of its periphery and contains within its internal cavity a hollow ring of hard elastic material, which is likewise open along its inner periphery. The wheel-rim is provided with bolts, which pass radially through it as well as through the india-rubber ring and whose heads engage in the cavity of the hard elastic ring, with which they can be brought into engagement by causing them to make a partial turn. The nuts of the said bolts are located on the inner side of the wheel or rim and preferably between the spokes. By gradually screwing the nuts on the bolts the internal ring is caused to contract in diameter and to press the india-rubber ring tightly and firmly upon the wheel-rim.

In Figures 1 to 3 I have shown my improvement applied to the rim of a carriage, Fig. 1 being a vertical section, Fig. 2 a section on the line 2 2 of Fig. 1, and Fig. 3 a section of Fig. 2 as seen from underneath the line 3 3. In Fig. 4 I have shown my improvement applied to the rim of a cycle-wheel.

Referring to Figs. 1, 2, and 3, A is the india-rubber ring of any approved form, having an opening B along the whole of its periphery and also having a cavity into which is inserted a hollow ring C, of steel or other metal, which is likewise provided with an opening D along the whole of its periphery, the openings B and D being adjacent to each other. The rubber ring A may have layers of canvas embedded in it, as shown by the dotted lines. The wheel-rim E, of metal or other material, is of any approved kind and shape. In the case of a carriage-wheel, as in the present instance, it is or may be fastened to an inner rim F, of wood or other material. The inner metal ring C is curved or otherwise shaped as regards its upper portion and it correspondingly fits the cavity of the rubber ring A, while its bottom portion is formed into two inclined annular rims G G', which are separated from each other by the opening D, as shown. The metal rim E is provided at intervals with openings H, which are on a line with the openings B and D, above referred to, for the reception of bolts I, the heads J of which are so formed at their under face as to fit the upper face of the inclined annular rims G G'. The opening H is slightly longer than the length of the head J of the bolt I for the purpose of allowing it to pass freely, after which a quarter of a turn is imparted to the bolt, so as to bring it into the position shown in Fig. 1.

The object of the inclined annular rims G G' is twofold. In the first instance, when tightening the bolt the head J thereof is prevented from rotating, because it is held by the said rims. In the second instance, when tightening the bolt the head J thereof in being drawn downwardly has a tendency to cause the two angular portions of the metal ring C to move away from each other, whereby the lower portion or bottom of the rubber ring A is forced against the inner walls of the rim E and thus more securely held therein.

Referring to Fig. 4, which shows my improvement applied to the rim of a cycle-wheel, the rubber ring A is substantially similar to the corresponding ring A of Fig. 1, except that it may be formed with a cavity A' for the purpose of increasing the resiliency of the same. The metal rim E is suited to a bicycle-wheel of any approved kind. The inner metal ring C is substantially similar to the ring C of Fig. 1 and has inclined rims G G'. The bolt I is likewise the same and fulfils a like purpose, but its nut bears direct against the metal rim E instead of bearing against the wooden rim F, as in the first construction.

I claim—

1. A tire composed of a rubber ring A, having an opening B, a metal ring C placed in a cavity of the ring A and having an opening D, a wheel-rim E and bolts I, substantially as described and shown.

2. A tire composed of a rubber ring A having an opening B, a metal ring C placed in a cavity of the ring A and having an opening D, the said ring C having inclined rims G, G' for the purpose specified, a wheel-rim E and bolts I, substantially as described and shown.

In witness whereof I have hereunto set my hand, this 13th day of September, 1897, in presence of two subscribing witnesses.

ALFRED DUCASBLE.

Witnesses:
DOUGLAS HORACE BRANDON,
EDWARD P. MACLEAN.